(12) United States Patent
Srinivasan et al.

(10) Patent No.: US 7,908,192 B2
(45) Date of Patent: Mar. 15, 2011

(54) SYSTEM AND METHOD FOR TIME RECORDING

(75) Inventors: Sudarshan Lakshmipuram Srinivasan, Karnataka (IN); Sudhindra Naib, Karnataka (IN)

(73) Assignee: SAP AG, Walldorf (DE)

( * ) Notice: Subject to any disclaimer, the term of this patent is extended or adjusted under 35 U.S.C. 154(b) by 1255 days.

(21) Appl. No.: 11/497,129

(22) Filed: Jul. 31, 2006

(65) Prior Publication Data

US 2008/0027778 A1 Jan. 31, 2008

(51) Int. Cl.
*G06F 15/02* (2006.01)
(52) U.S. Cl. ......... 705/32; 705/1; 705/7; 705/8; 705/11; 707/3; 715/772; 341/87
(58) Field of Classification Search .................... 705/32, 705/1, 7–11; 707/3; 715/772; 341/87
See application file for complete search history.

(56) References Cited

U.S. PATENT DOCUMENTS

| | | | | |
|---|---|---|---|---|
| 5,819,263 | A * | 10/1998 | Bromley et al. | 1/1 |
| 6,304,851 | B1 * | 10/2001 | Kmack et al. | 705/11 |
| 7,076,727 | B1 * | 7/2006 | Flam et al. | 715/202 |
| 7,571,111 | B2 * | 8/2009 | Ahrens et al. | 705/11 |
| 2004/0031035 | A1 * | 2/2004 | Shiu et al. | 718/102 |
| 2004/0249650 | A1 * | 12/2004 | Freedman et al. | 705/1 |
| 2007/0088585 | A1 * | 4/2007 | Maguire | 705/7 |
| 2008/0021757 | A1 * | 1/2008 | Majd et al. | 705/8 |

* cited by examiner

*Primary Examiner* — Vanel Frenel
(74) *Attorney, Agent, or Firm* — Mintz, Levin, Cohn, Ferris, Glovsky & Popeo, P.C.

(57) ABSTRACT

A method and system for time recording, in which an event is triggered to start recording one of a set of tasks. Recording of the one task is initiated responsive to triggering the event. The event is terminated and recording of the one task is terminated responsive to terminating the event.

32 Claims, 8 Drawing Sheets

SYSTEM AND METHOD FOR TIME RECORDING

TECHNICAL FIELD

Embodiments of the invention generally relate to the field of recording, managing and reporting time entries and, more particularly, to a method and system for time recording.

BACKGROUND

Time is recorded by individuals of an organization to keep track of the time they spend on various tasks relating to the organization. This time data facilitates organizations not only to plan their future strategies, but also to ensure early detection of abnormalities and plan mitigative measures. The effective tracking of time is critical to particular professions when compensations and charges are based upon the amount of time expended to provide a service or complete a project. Examples of professions where time keeping is important include attorneys, doctors and the like. Tracking time is also important for allocating project costs and meeting project completion deadlines. The time information recorded by the individuals of an organization is also useful in budgeting for future projects or services. Hence it is not only essential that individuals record time, but also to ensure their accuracy in doing so.

With existing time recording systems, time recording is a painful and tedious process for individuals of any organization. These systems do not allow an individual to record time to a task in real time while performing the task. Thus individuals have to remember their past activities and the time they spent on those tasks in order to record times to those tasks. Thus time data might not be accurate, especially when the data pertains to activities in the not-so-recent past and the granularity or the detail of recorded data might not be enough for a through analysis. Time recording represents an additional overhead for individuals of an organization, since they have to spend time recording time. Increasing the level of detail of recorded time data increases that overhead since individuals end up spending even more time to record their tasks.

The time recording process is an administrative overhead, including sending reminders etc. to individuals to record time spent on an organization's tasks. In addition, the user interfaces of the existing time recording and reporting systems are not very user-friendly.

SUMMARY OF THE INVENTION

Embodiments of the invention are generally directed to a method and system for time recording. An event is triggered to start recording one of a set of tasks. Recording of the one task is initiated responsive to triggering the event. At a later point in time, the event is terminated and recording of the one task is terminated responsive to terminating the event.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Figure 1:
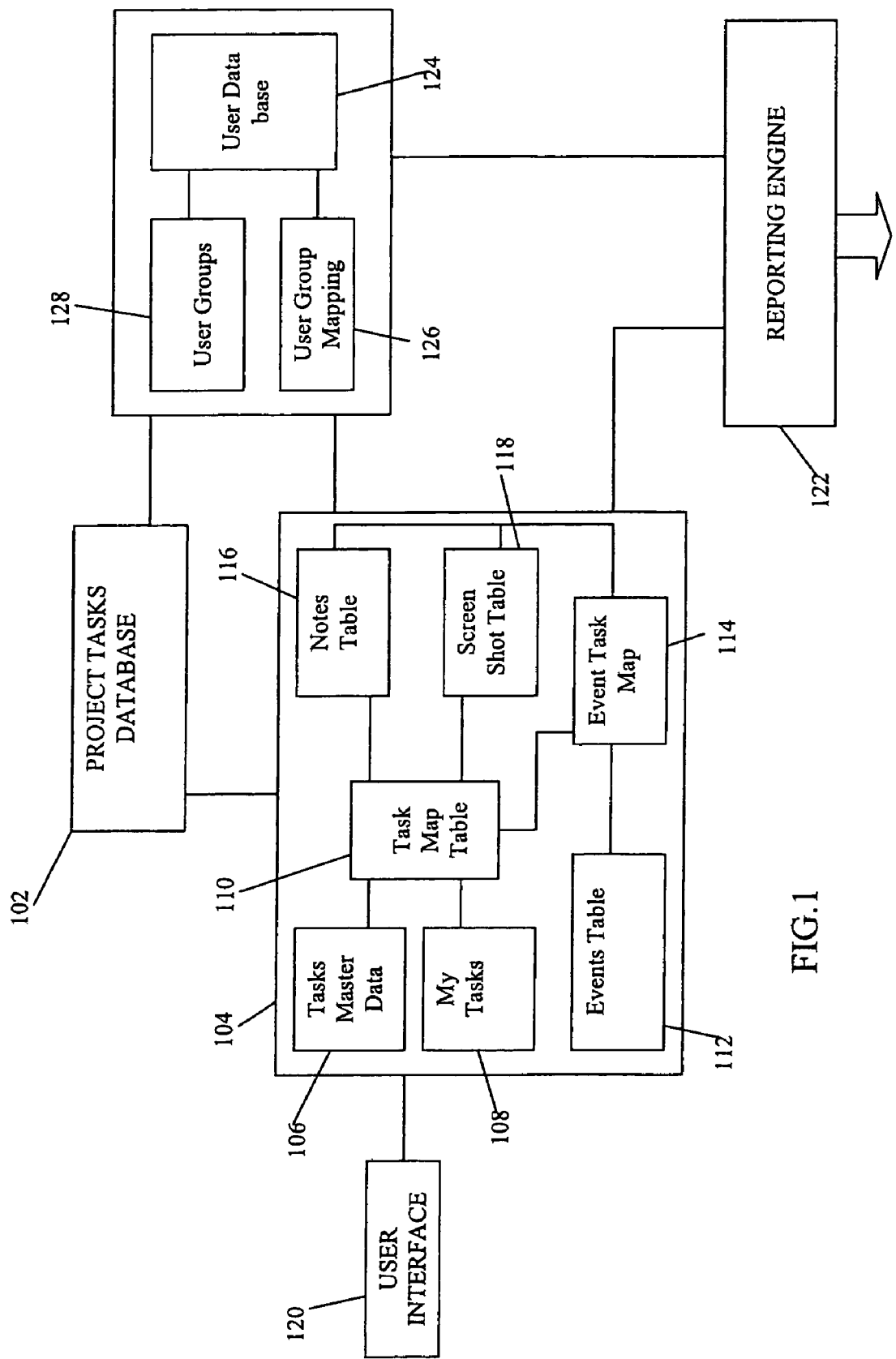
FIG. 1 illustrates a functional block diagram of a time recording system according to one embodiment of the invention.

FIG. 1 illustrates a functional block diagram 100 of a time recording system according to one embodiment of the invention. A project tasks database 102 stores data relating to all the project tasks in an organization for which time may be recorded, including, for example, the time line and deadline for each project task.

A project may include multiple tasks. Conversely, tasks may be a part of more than one project. For example an organization may have multiple projects with each project having its own set of tasks to be executed for the completion of the corresponding project. Of these sets of tasks one or more tasks may be common between a number of projects, that is, similar tasks might be executed as part of various projects. Thus project tasks database 102 may have a project task that is mapped to more than one project with each project having a different time line for that task.

The project tasks database may also store the percentage mapping of each task to a project. "Percentage mapping" is useful when users perform a task, of which they need to record only a certain fraction of the time they spend performing such task. This would mostly be useful, when a task that a user performs, is actually related to more than one of the project tasks. For example, let's assume that a user of an organization needs to work on two project tasks, "Provide Solutions to Client A" and "Research and Development". Since some part of the research that the user might do to provide solutions to client A's problems would also help in contributing to general research and development, the user may create a personal task "Common" and map it to both project tasks. The user may then assign for example 60% of the personal task "Common" to the project task "Provide Solutions to Client A" and the rest 40% to the project task "Research and Development". Thus 60% of the time recorded on the personal task "Common" is recorded against project task "Provide Solutions to Client A" and the remaining 40% of the time is recorded against the project task "Research and Development". Thus a user may map a certain percentage of a personal task to one or more project tasks.

Each client module 104 comprises a tasks master data store 106, personal tasks store 108, task map table 110, events table 112, event task map table 114, notes table 116 and screen shot table 118. The tasks master data store 106 stores a list of project tasks allocated to a user or employee. The personal tasks store 108 stores a list of user defined or user created tasks. A user may choose to break down a project task assigned to him into several personal tasks and record time on each of the personal tasks. A user may further break down a personal task into two or more sub-tasks and map the sub-tasks to the corresponding personal task. An administrator may then either choose to view the time recorded on each personal task or sub-task or view an aggregated time record for the project task including the time recorded on all corresponding personal tasks.

The user may also assign a public attribute or a private attribute to a personal task. The tasks assigned a public attribute are usually open to reporting while the tasks assigned a private attribute are not open to reporting, that is, reports on tasks assigned a public attribute may be generated and viewed by any authorized personnel whereas tasks assigned a private attribute are unavailable for reporting. The personal tasks assigned a private attribute may be tasks that are personal to a user and not mapped to any of the project tasks assigned to a user.

The task map table 110 stores the mapping relationships between the project tasks and corresponding personal tasks according to a set of mapping rules. The mapping rules may either be defined by a user, a supervisor, or the system itself. A change in recorded time data for a personal task is reflected in the project task mapped to the personal task, for example if a project task A is broken down by a user and mapped to three personal tasks a1, a2 and a3, then time recorded on each of the personal tasks results in a corresponding increase in the time recorded for the project task A.

A user records time for a task by triggering a recording event from a user interface (UI) 120. This triggering of a recording event may be accomplished in various ways including selecting a task to be recorded from a list of tasks provided by the UI 120, selecting a task and choosing a start event button in the UI 120, etc. Recording of a task commences in response to triggering of the recording event. To stop recording the task, a user terminates the triggered event through the UI 120. An event may also be automatically terminated without user intervention after a certain period of time elapses after triggering the event. For example, a timeout may be set which causes one or more triggered events to terminate automatically after expiry of the set timeout period. An event may also be set to terminate on the closure of an application.

An event may also be triggered or terminated remotely by an external system. This feature is particularly useful when a user does not perform his tasks on his client device. For example, a user may unexpectedly meet a customer at a remote location and start discussing certain official details. The user may trigger an event to record time against one or more tasks on his client device using a remote device for example a PDA, a remote computer linked to the internet etc.

An event identifier is assigned to each event. The event table 112 stores, for each event, an assigned event identifier, event date, event start time, event stop time and event duration. The event identifiers are mapped to the corresponding tasks. This mapping relationship between the event identifiers and corresponding tasks is stored in an Event Task Map Table 114. A user may create and record one or more notes about one or more tasks, for example a user might spend more time on a task than allotted and might provide reasons for the delay by creating a note. A user may record more than one task simultaneously by selecting the required tasks from the UI 120. A user may also record screen shots while recording a task, providing increased granularity or detail of the recorded data as may be helpful for analysis purposes.

The reporting engine 122 reports the recorded events for one or more tasks based on a reporting scheme defined by a supervisor or any authorized person to view reports.

After recording one or more tasks a user may submit the recording details to the reporting engine 122 to enable reporting the tasks. The reporting engine 122 may also directly extract information on one or more tasks without the tasks being submitted or made public depending upon a company's policies and administrator settings. A supervisor or any authorized user may view the reports on recorded time for one or more tasks. The supervisor might either view the reports on a project tasks level or if desired, may drill down the hierarchy and view recorded data on each personal task and any sub-tasks along with any recorded notes and screen shots for further details. This higher level of granularity enables an authorized user/supervisor to keep a track of project and task deadlines and reasons for the tasks getting delayed or not being met.

A user may record time on his personal tasks and the manager/project lead may see the aggregated values against project tasks i.e., the granularity of recording data could be as detailed as a user wishes and the granularity of reporting can handle aggregation at the highest level and can still support drilling down to the lowest available level. In principle, this means, unlike in conventional techniques, the granularity of recording is different and independent from granularity of reporting. Thus this provides dual and independent granularity of time recording details for recording and reporting.

In one embodiment of the invention a supervisor or authorized person may view reports on recorded tasks by sorting the tasks by user groups, for example viewing all the recorded tasks for a user group to monitor group performances.

Figure 2:
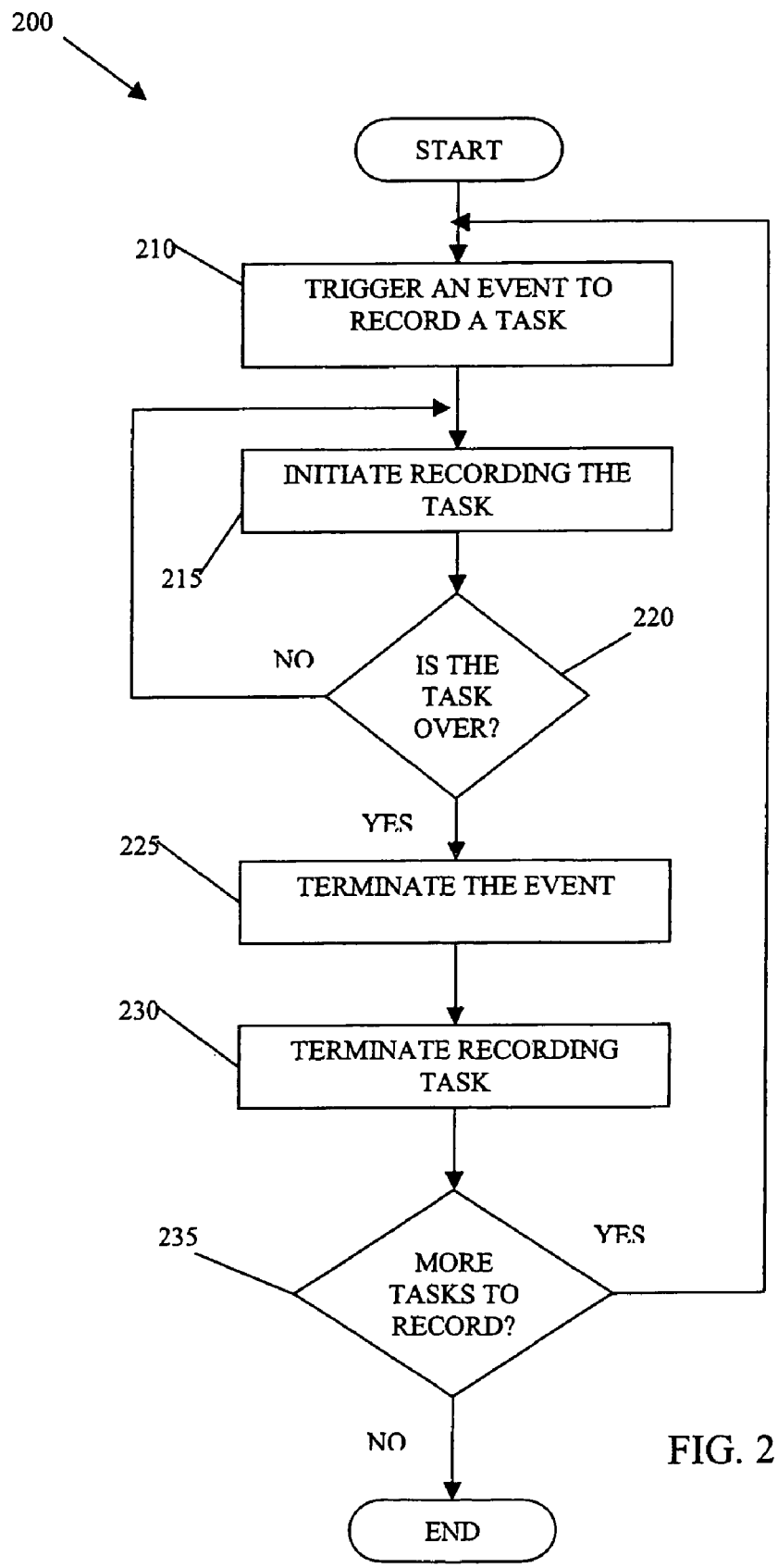
FIG. 2 is a flow chart illustrating a process for recording tasks in accordance with an embodiment of the invention.
Figure 3:
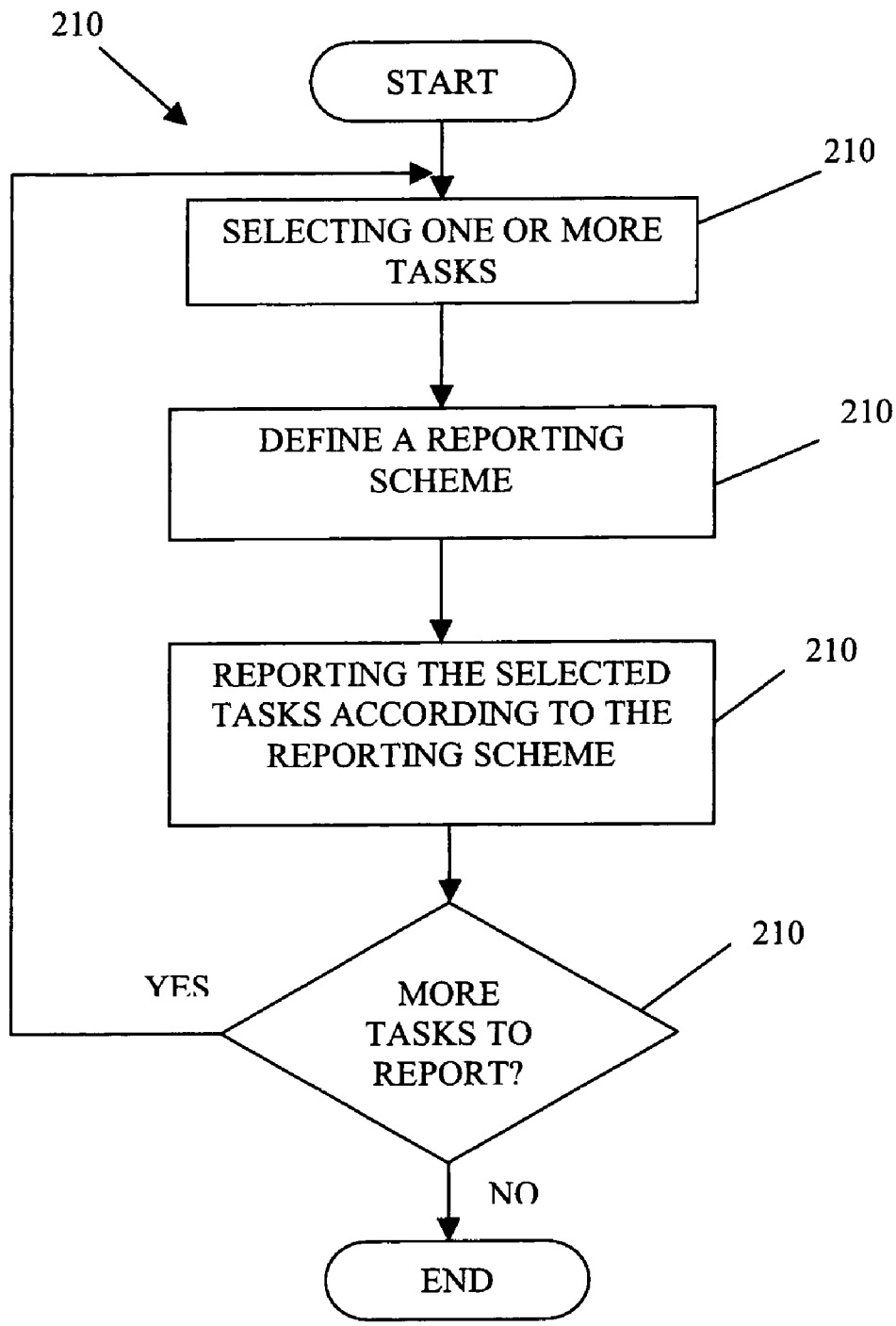
FIG. 3 illustrates a flow chart illustrating reporting recorded events for one or more tasks according to an embodiment of the invention.

Turning now to FIGS. 2 and 3, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 2 is a flow chart illustrating the process 200 for recording tasks in accordance with an embodiment of the invention. In a process block 210, a recording event is triggered to start recording a task. This triggering of a recording event may be accomplished in various ways including selecting a task to be recorded from a list of tasks provided by the UI 120, selecting a task and choosing a start event button in the UI 120, etc. In process block 215, recording of the task is initiated in response to the trigger of recording event. An event identifier is assigned to each event. The event table 112 stores the assigned event identifier, event date, and event start time. If the task is completed (decision block 220), the process 200 continues to process block 225 where the recording event is terminated from the UI 120. The event table 112 stores the event end time and event duration. Returning to decision block 220, if the task is not completed then the recording of the task continues. In process block 230 recording of the task is terminated in response to terminating the event in process block 225. The event identifiers are mapped to the corresponding tasks. This mapping relationship between the event identifiers and corresponding tasks is stored in the Event Task Map Table 114. A user may create and record one or more notes to record his comments about a particular task. A user may record more than one task simultaneously by selecting the required tasks from the UI 120. A user may also record screen shots while recording a task. In decision block 235 if there are more tasks to be recorded the process continues to process block 210. If there are no more tasks to be recorded in decision block 235, the process 200 is terminated.

FIG. 3 illustrates a flow chart illustrating reporting recorded events for one or more tasks according to one embodiment of the invention. In a process block 310 one or more tasks are selected to be reported. A supervisor or any authorized person may select tasks at project tasks level or one or more my tasks or sub-tasks for reporting. Such person may also select tasks for user groups. In process block 315 a reporting scheme is defined. For example a supervisor may choose to view reports in which one or more of event start time, event stop time, event duration and event data are listed. The supervisor may also choose to view only aggregated task duration without viewing each event detail. The supervisor may choose to view the details for a project task or my task along with all its sub tasks. In a similar manner a user may define a reporting scheme to view reports all possible ways and combinations. In process block 320 the selected tasks are reported according to the defined reporting scheme in process block 315. If there are more tasks to report (decision block 325), the process continues to process block 310. In decision block 325, if there are no more tasks to be reported, the process 300 is terminated.

Figure 4:
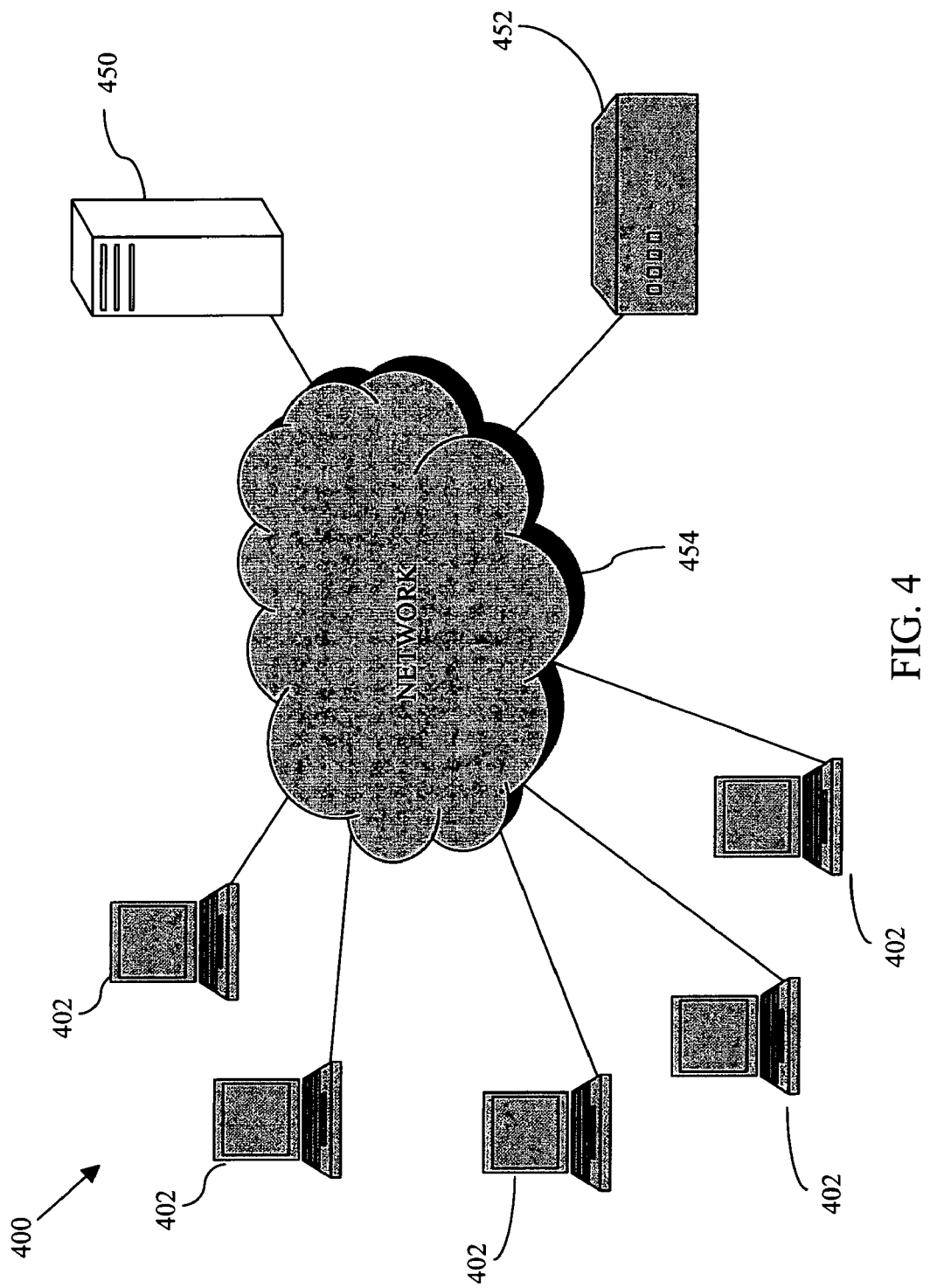
FIG. 4 illustrates a system for recording and reporting one or more tasks in accordance with an embodiment of the invention.

FIG. 4 illustrates a system 400 comprising one or more client devices 402, a server device 450, a reporting engine 452 and a network 454 connecting the client devices 402, server device 450 and the reporting engine 452. The users of each client device 402 are each allotted a set of project tasks. The tasks recorded on each client device are submitted to the server device 450. The server device 450 stores details of all the projects, project tasks, percentage mapping relationships between common project tasks, and their corresponding projects. The server device 450 is responsible for allocating project tasks to each client device. The server device 450 is also responsible for storing submitted data pertaining to recorded tasks from each client device.

The reporting engine 452 receives input in respect of one or more tasks to be reported, receives a reporting scheme and generates a report on an output device (not shown) according to the reporting scheme. The reporting engine 452 may receive input data from the client devices 402 and the server device 450 for generating the reports. The reporting engine 452 may access data of the recorded tasks directly from the client devices 402 or from the submitted data stored on the server device 450 or from both to generate its reports. In an embodiment, the reporting engine 452 is a part of the server device 450. In another embodiment each client device 402 comprises of a reporting engine 402 thus enabling locally generating and reporting time recorded on tasks assigned to a client device.

According to one embodiment of the invention, the client devices 402, server device 450, and reporting engine are connected over a network 454. The network 454 may either be a Local Area Network, a Wide Area Network, the Internet or any other network. The system also comprises necessary interface devices to enable effective communication between the various components of the network.

Figure 5:
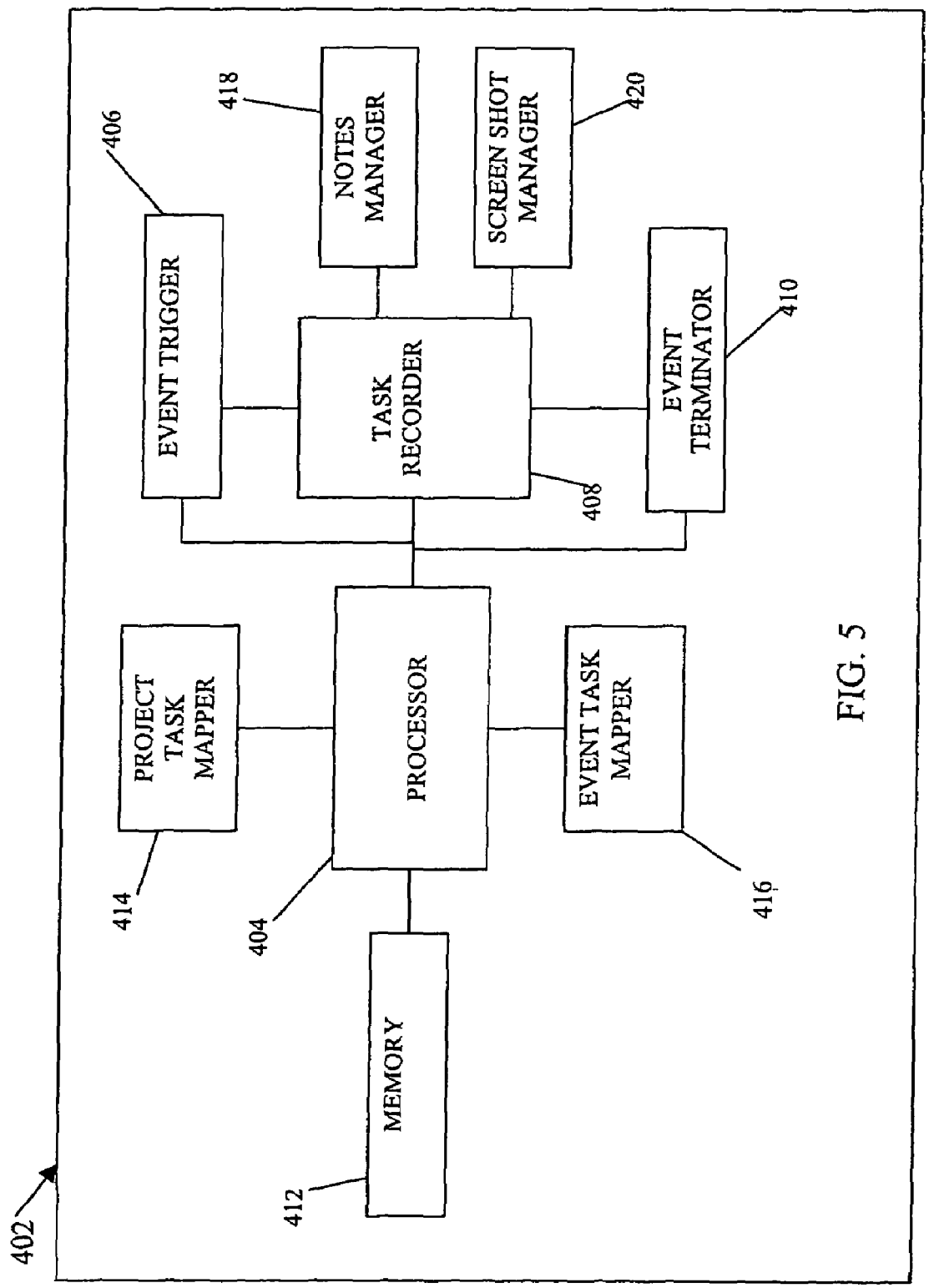
FIG. 5 illustrates a client device according to an embodiment of the invention.

FIG. 5 illustrates a client device 402. The client device 402 comprises a processor 404 in communication with a memory 412. An event trigger 406, an event terminator and a task recorder run on the processor. The memory 412 stores the project tasks assigned to the client device 402 and the user defined tasks. A project task mapper 414 maps one or more of the project tasks to a number of the user defined tasks according to a set of mapping rules. The memory 412 stores the mapping relationships between the project tasks and user defined tasks as a task map table.

The event trigger 406 receives a trigger input and triggers an event to record a task. The task recorder 408 initiates recording the task in response to the event trigger generated by the event trigger. Event terminator 410 terminates a triggered event to stop recording the task. The processor 404 assigns an event identifier to each event and maps the event identifier to its corresponding task. The event identifier for a task, event start time, event stop time, event duration and event date is stored in the memory 412. An event task mapper 416 maps the event identifiers to their corresponding tasks. The mapping relationship between event identifiers and the tasks are stored in a task map table in the memory 412. A notes manager 418 records user comments about a task. In addition, a screen shot manager 420 records screen shots for a task. The data for recorded events for the tasks may either be stored in the memory 412 or submitted to the server 450. The task recorder may also upon receiving input, record user comments and screen shots for a task being recorded.

The client devices may receive project tasks and their time lines dynamically from the server 450 over the network 454 or downloaded from the server time to time.

Figure 6:
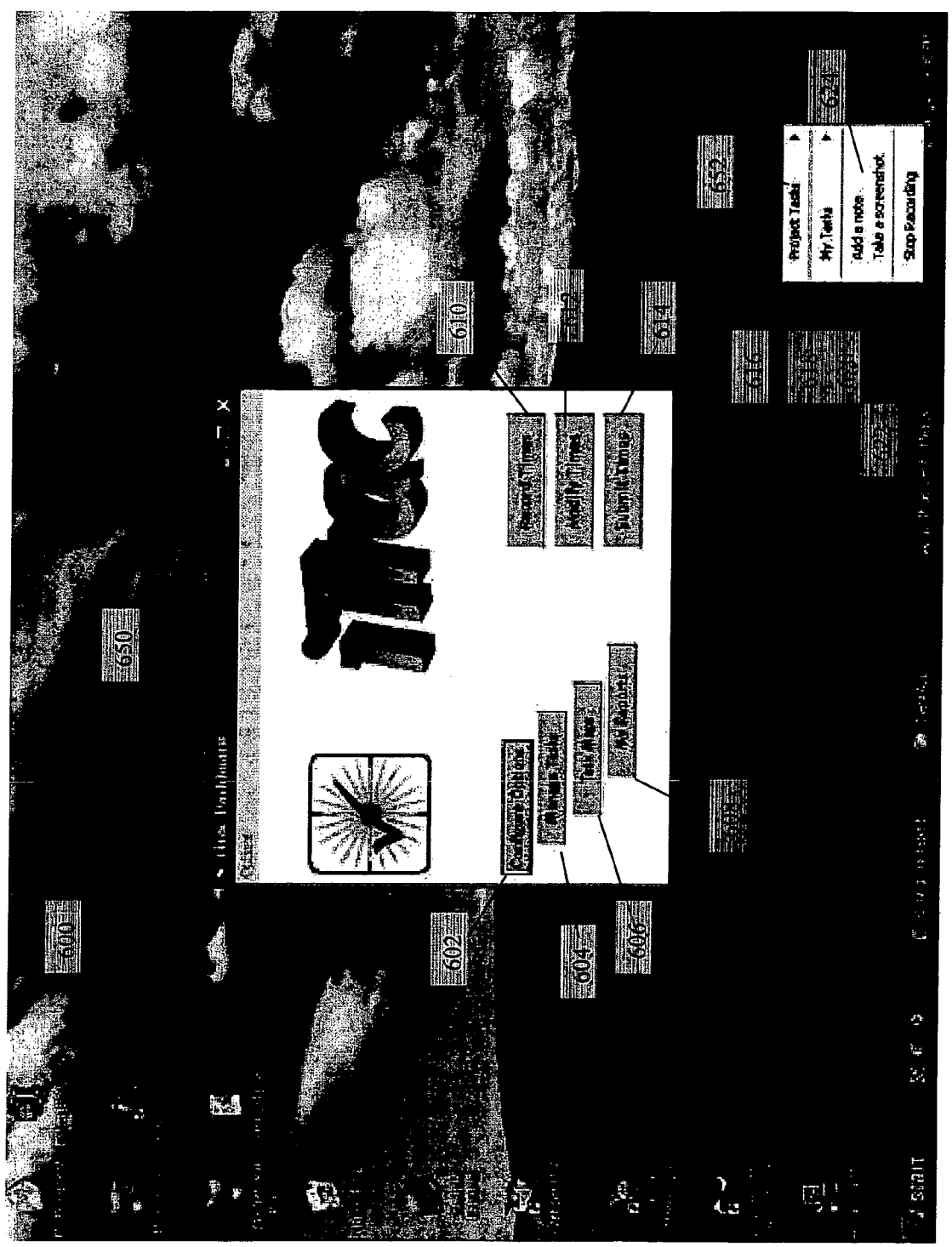
FIG. 6 illustrates a screen shot of a User Interface for recording and reporting tasks according to an embodiment of the invention.

FIG. 6 illustrates a screen shot of a User Interface (UI) 600 for recording and reporting tasks according to an embodiment of the invention. The main user window 650 provides option buttons enabling a user to perform various functionalities. The option button 610 enables the user to record time for one or more tasks. Upon selecting the option button 610 the user may be presented with a list of all tasks for which time could be recorded. This list of tasks may include project tasks as well as personal tasks. The user may then initiate an event to record time for a task by selecting the task and terminate the event to stop recording the task by deselecting the task. The user may also be presented with option buttons for recording notes and screen shots for one or more tasks. The option button 604 enables a user to manage his tasks, for example the user may create or delete personal tasks, rename the existing tasks and assign public and private attributes to the tasks. The option button 606 enables a user to view and create mapping relationships between various tasks. The user may map one task to multiple tasks or multiple tasks to one task. The user may also specify percentage mapping data.

Option button 608 enables a user to generate and view reports for one or more recorded tasks according to user defined reporting schemes. A user may select from various options and choose the manner in which to view the reports. Essentially the UI enables a user to choose various levels of granularity for recording as well as for reporting. Option button 612 enables a user to modify the time data recorded for the tasks, for example the recorded time duration for a task may be changed or the user comments on the recorded notes for a task may be changed. Option button 614 enables a user to submit the recorded time data for selected data to a server or a reporting engine. This time data may then be used by a server or a reporting engine to generate reports. Option button 602 enables a user to configure UI settings, for example window size, color, viewing format and resolution.

The short cut menu 652 provides limited menu options to the user to view and record tasks. The user may view his project tasks and personal tasks using the menu options 616 and 618 respectively. A recording event may be started and terminated by selecting and then deselecting respectively the task from project task menu option 616 or personal task menu option 618. The menu option 620 and 624 enable the user to record screen shots and notes respectively. A recording event may be terminated using the menu option 622.

Figure 7:
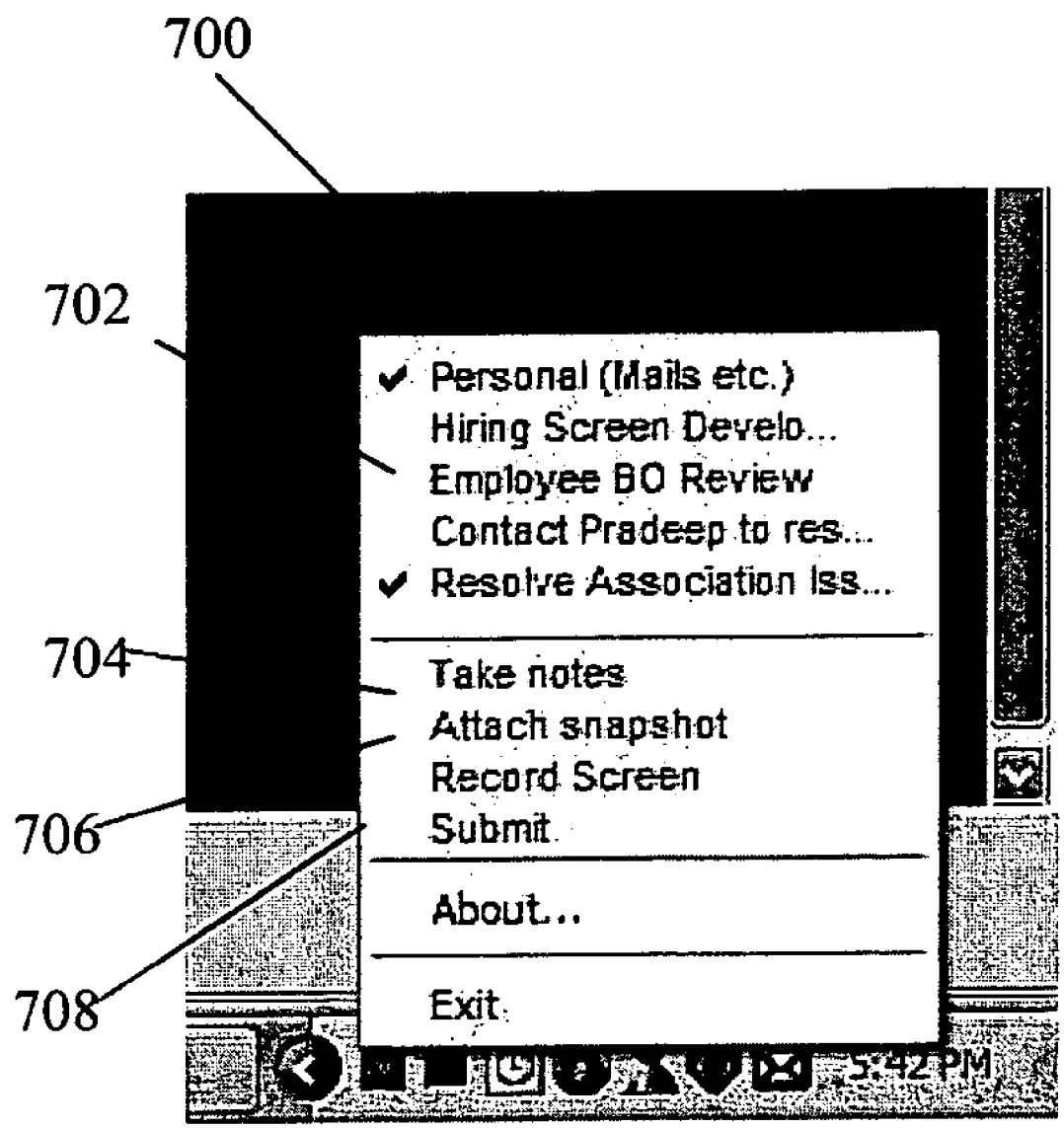
FIG. 7 illustrates a screen shot of a User Interface according to one embodiment of the invention.

FIG. 7 illustrates a screen shot of a User Interface according to an embodiment of the invention. The Figure shows a menu 700 that provides a set of tasks 702 which are selectable and de-selectable to initiate recording and terminate recording. The menu also provides options for recording notes 704 to record user comments for a task, to record screen shots 706, submit recorded data 708 for one or more tasks etc.

Figure 8:
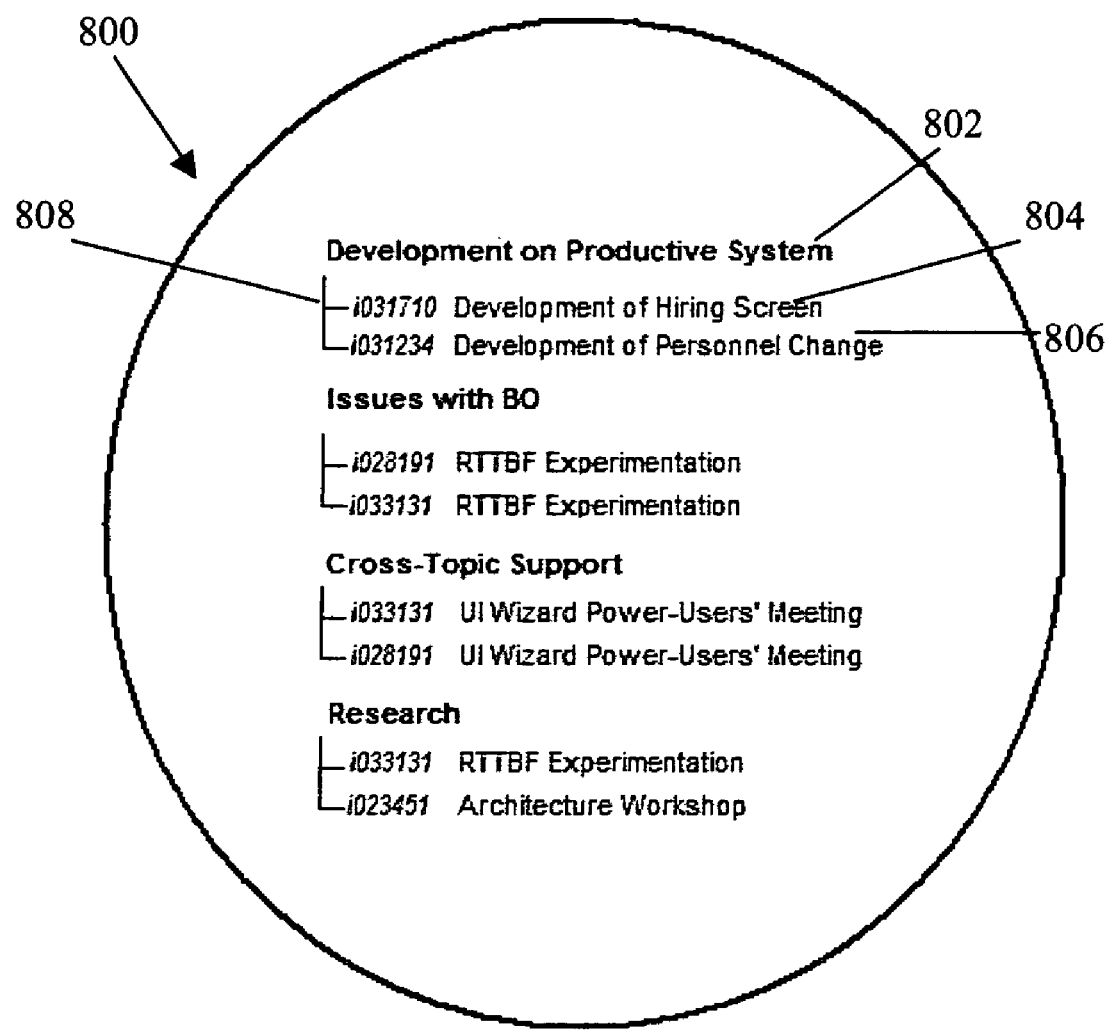
FIG. 8 illustrates a mapping relationship according to one embodiment of the invention.

FIG. 8 illustrates a mapping structure 800 between projects and tasks according to one embodiment of the invention. This figure essentially illustrates a scenario wherein the individuals of an organization are working on a number of projects simultaneously. Each project may have a number of tasks that need to be executed for the completion of the project. The projects Development on Productive System, Issues with BO, Cross-Topic Support and Research are mapped to their respective tasks. Each task is further assigned or mapped to a user with a user identifier. The user thus would work upon the assigned tasks. For example the project Development on Productive System (802) is mapped to tasks Development of Hiring Screen (804) and Development of Personnel Change (806). Further the task Development of Hiring Screen (804) is mapped to a user with user id i031710 (808). This mapping structure is typically stored in the server device 450 as shown in FIG. 4.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

What is claimed is:

1. A method for time recording, comprising:
triggering an event to record one of a set of tasks, wherein the set of tasks comprise one or more personal tasks assigned to a user and one or more project tasks of an organization, wherein the one or more personal tasks are stored in a first table and the one or more project tasks are stored in a second table, wherein a mapping table is used to map the one or more personal tasks to the one or more project tasks, and wherein the first table, the second table, and the mapping table are each separate tables, wherein the one or more project tasks are a part of a quantity of projects of the organization;
initiating recording of the one task responsive to the event stored in an event-task table, the event-task table including at least one event identifier representative of the event mapped to the one task;
terminating the event; and
terminating recording of the one task responsive to terminating the event, wherein, when the one task corresponds to the one or more personal tasks, the one task is allocated to the one or more project tasks based on a percentage stored in the second table; and
reporting the recording, wherein the reporting further comprises selecting one or more of the set of tasks available to the user, defining a reporting scheme, and reporting the event according to the reporting scheme, wherein at least one of the triggering, the initiating, the terminating the event, the terminating recording, and the reporting are implemented on at least one processor.

2. The method of claim 1, further comprising:
providing a page for presentation at a user interface, the page including the set of tasks comprising the one or more personal tasks and the one or more project tasks, the set of tasks selectable at the user interface, the page further comprising a first selection for recording user comments, a second selection for recording a screen shot, and a third selection for submitting recorded data for the set of tasks.

3. The method of claim 1, wherein triggering the event comprises receiving input to select the one task from a list of tasks in a computer user interface.

4. The method of claim 3, wherein terminating the event comprises terminating the triggered event by receiving input to deselect the one task from a list of tasks in a computer user interface.

5. The method of claim 1, further comprising creating one or more notes to record user comments about the one task.

6. The method of claim 1, further comprising creating one or more screen shots for the one task.

7. The method of claim 1, wherein the event is triggered remotely.

8. The method of claim 1, wherein the event is terminated remotely.

9. The method of claim 1, wherein the event is automatically terminated after a preset period of time.

10. The method of claim 1, further comprising: assigning an event identifier to the event; and mapping the event identifier to the one task.

11. The method of claim 1, further comprising selecting one or more of the user defined tasks mapped to a project task.

12. The method of claim 1, wherein the tasks are assigned a public attribute or a private attribute.

13. A non-transitory machine-accessible medium that provides instructions that, when executed by a machine, cause the machine to perform operations comprising:
triggering an event to record one of a set of tasks, wherein the set of tasks comprise one or more personal tasks assigned to a user and one or more project tasks of an organization, wherein the one or more personal tasks are stored in a first table and the one or more project tasks are stored in a second table, wherein a mapping table is used to map the one or more personal tasks to the one or more project tasks, and wherein the first table, the second table, and the mapping table are each separate tables, wherein the one or more project tasks are a part of a number of projects of the organization;

initiating recording of the one task responsive to the event stored in an event-task table, the event-task table including at least one event identifier representative of the event mapped to the one task;

terminating the event; and terminating recording of the one task responsive to terminating the event, wherein, when the one task corresponds to the one or more personal tasks, the one task is allocated to the one or more project tasks based on a percentage stored in the second table; and reporting the recording, wherein reporting further comprises selecting one or more of the set of tasks available to the user; defining a reporting scheme, and reporting the event according to the reporting scheme.

14. The non-transitory machine-accessible medium of claim 13, further comprising mapping one or more of the project tasks to a number of the user defined tasks according to a set of mapping rules.

15. The non-transitory machine-accessible medium of claim 13, wherein triggering the event comprises receiving input to select the one tasks from a list of tasks in a computer user interface.

16. The non-transitory machine-accessible medium of claim 13, wherein terminating the event comprises terminating the triggered event by receiving input to deselect the one task from a list of tasks in a computer interface.

17. The non-transitory machine-accessible medium of claim 13, further providing instructions which when executed by the machine, cause the machine to perform further operations comprising creating one or more notes to record user comments about the one task.

18. The non-transitory machine-accessible medium of claim 13, further providing instructions which when executed by the machine, cause the machine to perform further operations comprising creating one or more screen shots for the one task.

19. The non-transitory machine-accessible medium of claim 13, further providing instructions which when executed by the machine, cause the machine to perform further operations comprising: assigning an event identifier to the event; and mapping the event identifier to the one task.

20. The non-transitory machine-accessible medium of claim 13, further providing instructions which when executed by the machine, cause the machine to perform further operations comprising reporting the recorded events for one or more of the set of tasks.

21. The non-transitory machine-accessible medium of claim 20, reporting comprises: selecting one or more of the set of tasks available to a user; defining a reporting scheme; and reporting events recorded for the selected tasks according to the reporting scheme.

22. The non-transitory machine-accessible medium of claim 13, wherein the tasks are assigned a public attribute or a private attribute.

23. The non-transitory machine-accessible medium of claim 22 wherein a task with a private attribute is not reported.

24. A system comprising:

one or more client devices, each client device comprising:

a processor in communication with a memory, the memory storing a set of tasks to be recorded;

an event trigger to trigger an event to record one of the set of tasks, wherein the set of tasks comprise one or more personal tasks assigned to a user and one or more project tasks of an organization, wherein the one or more personal tasks are stored in a first table and the one or more project tasks are stored in a second table, wherein a mapping table is used to map the one or more personal tasks to the one or more project tasks, and wherein the first table, the second table, and the mapping table are each separate tables, wherein the one or more project tasks are a part of a quantity of projects of the organization;

a task recorder to initiate recording of the one task responsive to triggering the event stored in an event-task table, the event-task table including at least one event identifier representative of the event mapped to the one task;

an event terminator to terminate the event, the task recorder terminating recording of the one task responsive to terminating the event, wherein when the one task corresponds to the one or more personal tasks, the one task is allocated to the one or more project tasks based on a percentage stored in the second table; and a server device in communication with the client devices to store, manage and allot the sets for tasks for each client device.

25. The system of claim 24, further comprising a project task mapper to map one or more of the project tasks to a number of the user defined tasks according to a set of mapping rules and store the mapping relationships in a task map table.

26. The system of claim 24, further comprising a notes mapper to record user comments about the one task.

27. The system of claim 24, further comprising a screen shot manager to record one or more screen shots for the one task.

28. The system of claim 24, wherein the processor assigns an event identifier to the event, the memory storing the event identifier in an event table.

29. The system of claim 28, further comprising an event task mapper to map the event identifier to the one task, the memory storing a mapping relationship between the event identifier and the one task in an event task map table.

30. The system of claim 24, further comprising: a reporting engine in communication with the client devices and the server, the reporting engine reporting events recorded for a selected set of tasks according to a predetermined reporting scheme.

31. The system of claim 30, wherein the reporting engine is connected to the client devices and the server through a communication network.

32. The system of claim 24, wherein the server and the client devices are connected through a communication network.

* * * * *